United States Patent Office 3,748,352
Patented July 24, 1973

3,748,352
DIALKYL 2-[1-(3-THIOSEMICARBAZONO)ETHYL]-
ALKYLENEDIOATES
Arthur A. Santilli, Havertown, and Dong H. Kim, Wayne, Pa., assignors to American Homes Products Corporation, New York, N.Y.
No Drawing. Original application Dec. 30, 1970, Ser. No. 102,952, now Patent No. 3,704,242. Divided and this application July 25, 1972, Ser. No. 274,957
Int. Cl. C07c 159/00
U.S. Cl. 260—481 R    4 Claims

ABSTRACT OF THE DISCLOSURE

Dialkyl 2 - [1 - (3-thiosemicarbazono)ethyl]succinates and glutarates of the formula:

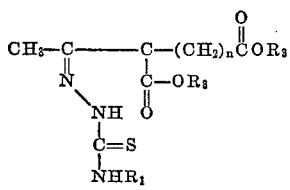

wherein $R_1$ is hydrogen or lower alkyl, $R_3$ is lower alkyl and $n$ is 1 or 2, are intermediates for the preparation of 5-hydroxy-3-alkyl-1-(thiocarbamoyl or alkylthiocarbamoyl)pyrazoles of the formula:

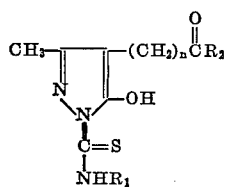

in which
  $R_1$ is hydrogen or lower alkyl,
  $R_2$ is hydroxy, amino or lower alkoxy, and
  $n$ is 1 or 2,
the latter compounds being active as inhibitors of *Mycobacterium tuberculosis*.

RELATED APPLICATIONS

This application is a divisional application of S.N. 102,952 filed Dec. 30, 1970 by Arthur A. Santilli and Dong H. Kim, now U.S. Pat. No. 3,704,242.

BRIEF DESCRIPTION OF THE INVENTION

In accordance with this invention there is provided compounds of the formula:

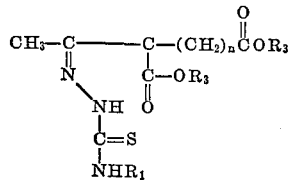

in which
$R_1$ is hydrogen or lower alkyl,
$R_3$ is lower alkyl, and
$n$ is 1 or 2.

The compounds provided by this invention are intermediates for the production of 5-hydroxy-3-alkyl-1-(thiocarbamoyl or alkylthiocarbamoyl)-pyrazoles of the formula:

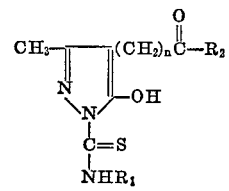

wherein $R_1$ is hydrogen or lower alkyl,
$R_2$ is hydroxy, amino or lower alkoxy, and
$n$ is 1 or 2.

The pyrazoles are useful for the in vitro inhbiition of *M. tuberculosis*.

The compounds of this invention are prepared by admixing an appropriately substituted thiosemicarbazide with a 2-acetyl substituted succinic acid ester or glutaric acid ester in the presence of an inert organic solvent.

Generally it is preferred to reflux the reactants for about 2 to about 14 hours. The intermediate compounds of this invention may be isolated if desired or ring closure may be effected to directly form the pyrazole. Ring closure is effected preferably in the presence of sodium hydroxide or ammonium hydroxide followed by acidification preferably with hydrochloric or glacial acetic acid.

Thus, the intermediates of this invention are prepared by the following reaction scheme, in which $R_1$, $R_3$ and $n$ are defined above:

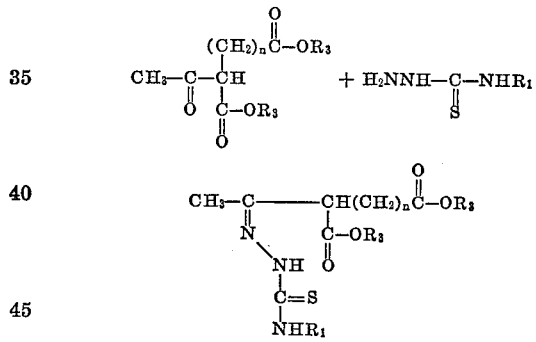

The intermediate compounds of this invention are readily ring closed to form the corresponding pyrazole by initially treating the intermediate with a base such as NaOH or NH$_4$OH followed by acidification with an acid such as hydrochloric or glacial acetic acid, thusly:

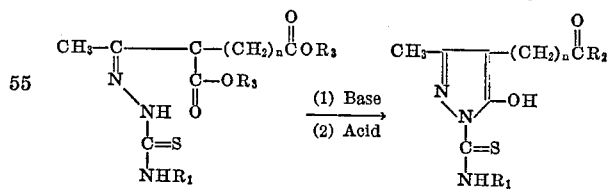

The biologically active pyrazoles produced from the intermediates of this invention have been tested by determining the minimal inhibitory concentration which will completely inhibit *M. tuberculosis*, human type, strain H37Rv. The compounds of the invention have been found to be active when admixed with the test organism in an aqueous dispersion at a concentration of 0.5 µg./ml. The compounds thus may be employed for example in hospitals, sanitariums and the like to effectively inhibit the causative organism of tuberculosis by contacting infected areas and materials with aqueous dispersions of said compounds. In addition the compounds of the invention possess activity against *Endamoeba histolytica*.

EXAMPLE I 5-hydroxy-3-methyl-1-(thiocarbamoyl)pyrazole-4-acetic acid, ethyl ester A mixture of 4.56 grams of thiosemicarbazide, and 10.8 grams of diethyl acetylsuccinate in 250 milliliters of ethanol was heated with stirring under reflux for overnight. The ethanol was removed on a rotary evaporator in vacuo. To the residual oil (diethyl 2-[1-(thiosemicarbazono)ethyl]succinate) was added 250 milliliters of concentrated ammonium hydroxide solution. The reaction mixture was heated on a steam bath for a few minutes, cooled and filtered. The filtrate was acidified to pH 4 with concentrated hydrochloric acid solution. A crystalline product was deposited (2 grams). Recrystallization of the product from benzene gave a product with M.P. 146–148° C.

*Elemental analysis.*—Calc'd for $C_9H_{13}N_3O_3S$ (percent): C, 44.43; H, 5.38; N, 17.27. Found (percent): C, 44.27; H, 5.30; N, 17.34.

EXAMPLE II 5-hydroxy-3-methyl-1-(thiocarbamoyl)pyrazole-4-propionic acid, ethyl ester A mixture of 9.1 grams of thiosemicarbazide and 23.0 grams of diethyl 2-acetylglutarate in 250 milliliters of ethanol was heated under reflux with stirring for 5 hours. The reaction mixture was taken to dryness on a rotary evaporator. The residual oil (diethyl 2-[1(thiosemicarbazono)ethyl]glutarate) was treated with 100 milliliters of 30 percent sodium hydroxide solution. When a clear solution was obtained the solution was cooled in ice and acidified to pH 4 with glacial acetic acid. A crystalline product was deposited (20.1 grams) which after recrystallization from ethanol gave a product with M.P. 149–150° C.

*Elemental analysis.*—Calc'd for $C_{10}H_{15}N_3O_3S$ (percent): C, 46.68; H, 5.88; N, 16.33; S, 12.46. Found (percent): C, 46.35; H, 6.00; N, 16.03; S, 12.36.

EXAMPLE III

Diethyl 2-[1-(4-methyl-3-thiosemicarbazono)ethyl]succinate

A mixture of 5.25 grams of 4-methyl-3-thiosemicarbazide and 10.8 grams of diethyl acetylsuccinate in 250 milliliters of 95 percent ethanol was heated under reflux with stirring for 14 hours. On cooling the reaction mixture in ice a crystalline product diethyl 2-[1-(4-methyl-3-thiosemicarbazono)ethyl]succinate was deposited which on recrystallization from ethanol gave a product with M.P. 84–85° C.

*Elemental analysis.*—Calc'd for $C_{12}H_{21}N_3O_4S$ (percent): C, 47.51; H, 6.98; N, 13.85. Found (percent): C, 47.18; H, 7.14; N, 13.70. This compound while useful as an intermediate, also possesses immunosuppressive activity.

EXAMPLE IV 5-hydroxy-3-methyl-1-(methylthiocarbamoyl)pyrazole-4-acetic acid, ethyl ester To 50 milliliters of concentrated ammonium hydroxide was added 4.7 grams of diethyl 2-[1-(4-methyl-3-thiosemicarbazono)ethyl]succinate. The mixture was warmed gently until a clear solution was obtained. The reaction mixture was cooled in ice and quickly neutralized with glacial acetic acid. A precipitate was deposited which was collected and recrystallized from ethanol. There was obtained 0.6 gram of product, M.P. 151–153° C.

*Elemental analysis.*—Calc'd for $C_{10}H_{15}N_3O_3S$ (percent): C, 46.68; H, 5.88; N, 16.33; S, 12.46. Found (percent): C, 46.37; H, 5.91; N, 16.72; S, 12.43.

EXAMPLE V 5-hydroxy-3-methyl-1-(methylthiocarbamoyl)pyrazole-4-acetamide

To 100 milliliters of concentrated ammonium hydroxide was added 6.4 grams diethyl 2-[1-(4-methyl-3-thiosemicarbazono)ethyl]succinate. The mixture was heated on a steam bath for approximately 15 minutes. The solution thus obtained was cooled in ice and neutralized with glacial acetic acid. A precipitate was deposited which amounted to 3.6 grams after collection by suction filtration. This material was washed with hot ethanol and filtered. The portion of insoluble material was recrystallized from a large volume of ethanol, the pure product has a M.P. 181–183° C.

*Elemental analysis.*—Calc'd for $C_8H_{12}N_4O_2S$ (percent): C, 42.09; H, 5.30; N, 24.54; S, 14.04. Found (percent): C, 42.01; H, 5.41; N, 24.19; S, 13.79.

EXAMPLE VI 5-hydroxy-3-methyl-1-(thiocarbamoyl)pyrazole-4-acetic acid

A mixture of 4.56 grams of thiosemicarbazide and 10.8 grams of diethyl acetylsuccinate in 250 milliliters of ethanol was heated with stirring under reflux overnight. The ethanol was removed on a rotary evaporator in vacuo. To the residual oil was added 250 milliliters of 1 N sodium hydroxide solution. The reaction mixture was heated for 30 minutes at 50° C. The reaction mixture was filtered and the filtrate acidified with concentrated hydrochloric acid. A precipitate was deposited which upon recrystallization from ethanol gave 2.3 grams of product, M.P. 178–179° C.

*Elemental analysis.*—Calc'd for $C_7H_9N_3O_3S$ (percent): C, 39.06; H, 4.21; N, 19.51. Found (percent): C, 39.35; H, 4.25; N, 19.69.

EXAMPLE VII

By methods analogous to those employed above the following compounds are prepared. The solvent selected for carrying out the reaction should be $R_3OH$ so that undesirable transesterification will not occur.

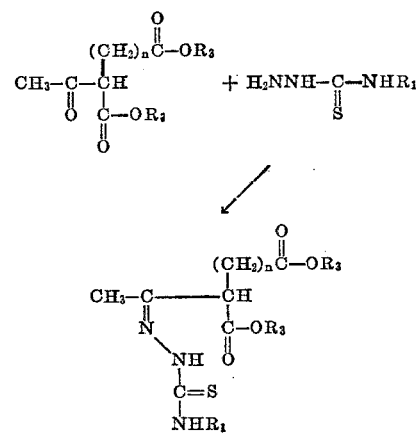

wherein $R_1$, $R_3$ and $n$ are as follows:

| $R^1$ | $R^3$ | $n$ |
|---|---|---|
| Ethyl | n-Propyl | 1 |
| n-Propyl | Methyl | 2 |
| Methyl | n-Butyl | 1 |
| n-Butyl | i-Propyl | 2 |
| n-Propyl | Ethyl | 2 |
| Methyl | Methyl | 1 |

What is claimed is:
1. A compound of the formula:

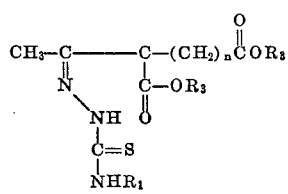

wherein
R$_1$ is hydrogen or lower alkyl,
R$_3$ is lower alkyl, and
$n$ is 1 or 2.

2. The compound of claim 1 which is diethyl 2-[1-(4-methyl-3-thiosemicarbazono)ethyl]succinate.
3. The compound of claim 1 which is diethyl 2-[1-(thiosemicarbazono)ethyl] glutarate.
4. The compound of claim 1 which is diethyl 2-[1-(thiosemicarbazono)ethyl] succinate.

No references cited.

LORRAINE A. WEINBERGER, Primary Examiner
J. F. TERAPANE, Assistant Examiner

U.S. Cl. X.R.
424—313